(12) United States Patent
Nakazawa et al.

(10) Patent No.: US 7,259,206 B2
(45) Date of Patent: Aug. 21, 2007

(54) WATER-BORNE RESIN COMPOSITION AND ELECTROCOATING COMPOSITION

(75) Inventors: Noriyuki Nakazawa, Osaka (JP); Takayuki Kokubun, Osaka (JP); Ichiro Kawakami, Osaka (JP); Hiroyuki Sakamoto, Hyogo (JP)

(73) Assignee: Nippon Paint Co., Ltd., Osaka (JP)

( * ) Notice: Subject to any disclaimer, the term of this patent is extended or adjusted under 35 U.S.C. 154(b) by 236 days.

(21) Appl. No.: 10/933,489

(22) Filed: Sep. 3, 2004

(65) Prior Publication Data
US 2005/0059774 A1   Mar. 17, 2005

(30) Foreign Application Priority Data
Sep. 4, 2003   (JP)   .............................. 2003-312568

(51) Int. Cl.
*C08L 79/08*   (2006.01)
(52) U.S. Cl. ....................................... 524/538
(58) Field of Classification Search ................ 524/599, 524/538, 514; 528/170, 353, 310, 322; 523/204–205, 523/208–209, 351
See application file for complete search history.

(56) References Cited

FOREIGN PATENT DOCUMENTS

| | | |
|---|---|---|
| JP | 5-295324 | 11/1993 |
| JP | 9-124978 | 5/1997 |
| JP | 2000-38525 | 2/2000 |
| JP | 2001-351441 | 12/2001 |
| JP | 2002-38078 | 2/2002 |

*Primary Examiner*—Ana Woodward
(74) *Attorney, Agent, or Firm*—Westerman, Hattori, Daniels & Adrian, LLP

(57) ABSTRACT

It is an object of the present invention to provide a water-borne resin composition which can form a film being excellent in flexibility and heat resistance without reducing an insulating property and can be used suitably for a cationic electrocoating composition.

A water-borne resin composition, having a hydrolysable functional group and a polymerizable unsaturated carbon bond, wherein a base resin is at least one species selected from the group consisting of a polyamide-imide resin, a polyamide resin and a polyimide resin.

5 Claims, No Drawings

WATER-BORNE RESIN COMPOSITION AND ELECTROCOATING COMPOSITION

TECHNICAL FIELD

The present invention relates to a water-borne resin composition and an electrocoating composition.

BACKGROUND ART

As undercoating of metal materials or the like, there is generally employed cationic electrodeposition having high corrosion resistance. Furthermore, as a special use, cationic electrodeposition may be utilized in order to form an electric insulating film on the metal material. As a cationic electrocoating composition used in such the cationic electrodeposition, there is known a water-borne resin composition, which contains an epoxy resin as a base resin and has a hydrolysable functional group and a polymerizable unsaturated carbon bond (cf. Japanese Kokai Publication 2000-038525). In order to obtain a film having adequate heat resistance using such a resin, it is required to form a cured film having a high crosslinking density. Therefore, there were cases where the flexibility of the obtained film became insufficient and the processability of the film was reduced.

On the other hand, there is generally disclosed an electric insulating coating composition using a polyamide-imide resin, a polyamide resin and a polyimide resin as a base resin (cf. Japanese Kokai Publication Hei-05-295324 and Japanese Kokai Publication 2001-351441). It is known that these base resins can give a film having good heat resistance and excellent flexibility even if a cured film having a high crosslinking density is not necessarily formed because of high heat resistance of the resin itself. However, these electric insulating coating compositions contain organic solvent in large amounts and have a problem from the viewpoint of environmental protection.

There are disclosed electrocoating compositions, which are water-borne coatings and contain a polyimide resin, having such a function, as a base resin (cf. Japanese Kokai Publication Hei-09-124978 and Japanese Kokai Publication 2002-38078). However, since such the electrocoating compositions had insufficient stability, they were not substances capable of with standing long-term uses. And the obtained film did not have a sufficient film thickness and a satisfactory electrical insulating property.

SUMMARY OF THE INVENTION

It is an object of the present invention to provide a water-borne resin composition which can form a film being excellent in flexibility and heat resistance without reducing an insulating property and can be used suitably for a cationic electrocoating composition.

The present invention relates to a water-borne resin composition, having a hydrolysable functional group and a polymerizable unsaturated carbon bond, wherein a base resin is at least one species selected from the group consisting of a polyamide-imide resin, a polyamide resin and a polyimide resin.

The above-mentioned hydrolysable functional group is preferably an onium group.

The above-mentioned onium group is preferably a sulfonium group.

The above-mentioned polymerizable unsaturated carbon bond preferably derives from a propargyl group.

Preferably, the above-mentioned water-borne resin composition contains a sulfonium group in an amount of 5 to 100 mmol and a propargyl group in an amount of 10 to 150 mmol per 100 g of the resin solids and the total content of the sulfonium group and the propargyl group is 200 mmol or less per 100 g of the resin solids.

The present invention also relates to an electrocoating composition comprising the above water-borne resin composition.

DETAILED DESCRIPTION OF THE INVENTION

Hereinafter, the present invention will be described in detail.

A water-borne resin composition of the present invention is a substance, which has a hydrolysable functional group and a polymerizable unsaturated carbon bond and contains at least one species selected from the group consisting of a polyamide-imide resin, a polyamide resin and a polyimide resin as a base resin. By containing the above-mentioned at least one species selected from the group consisting of the polyamide-imide resin, the polyamide resin and the polyimide resin as a base resin, the water-borne resin composition of the present invention can attain a film which is excellent in an electrical insulating property, heat resistance, processability and flexibility. And, since it can be treated in an aqueous condition, it is safe and can reduce a volatile organic compound (VOC).

The above-mentioned water-borne resin composition is one which can be used suitably for electrodeposition. Since it can be applied by electrodeposition, it can be uniformly applied to a substrate and can form a coat, which has less variations in a film thickness, on the substrate even for a substrate having a complex configuration.

A base resin of the water-borne resin composition of the present invention is at least one species selected from the group consisting of a polyamide-imide resin, a polyamide resin and a polyimide resin. Since the water-borne resin composition of the present invention contains these resins as a base resin, it can exert good heat resistance. The above-mentioned polyamide resin is not particularly limited and for example, a compound, prepared by blending a dicarboxylic acid with a diamine compound or diisocyanate and polycondensing them, or a compound, prepared by blending a halogenated dicarboxylic acid with a diamine compound and conducting de-hydrogen halide reaction, can be given. The above-mentioned polyimide resin is not particularly limited and for example, a compound, prepared by blending tetracarboxylic dianhydride with a diamine compound or diisocyanate and polycondensing them, can be given. The above-mentioned polyamide-imide resin is not particularly limited and for example, a compound, prepared by blending tricarboxylic anhydride with a diamine compound or diisocyanate and polycondensing them, can be given.

As the above-mentioned dicarboxylic acid, there can be given, specifically, aliphatic dicarboxylic acids or derivatives thereof such as adipic acid, azelaic acid and sebacic acid; and aromatic or alicyclic dicarboxylic acids or derivatives thereof such as terephthalic acid, isophthalic acid, 2-chloroterephthalic acid, terephthalic acid dichloride, 2-methyl terephthalate, 5-methyl isoterephthalate, hexahydroterephthalic acid, and hexahydroisophthalic acid.

As the above-mentioned tetracarboxylic dianhydride, there can be given, specifically, pyromellitic dianhydride, 3,4,3',4'-benzophenonetetracarboxylic dianhydride, 3,4,3', 4'-diphenylsulfontetracarboxylic dianhydride, bis-(3,4-dicarboxyphenyl) ether anhydride, 2,2-bis-(3,4-dicarboxyphenyl)hexafluoropropane dianhydride, and the like.

As the above-mentioned tricarboxylic anhydride, there can be given, specifically, tricarboxylic anhydrides and derivatives thereof such as butanetricarboxylic anhydride, trimellitic anhydride, benzophenonetricarboxylic anhydride, diphenylsulfontricarboxylic anhydride, diphenyl ether tricarboxylic anhydride, diphenyl tricarboxylic anhydride, diphenylpropanetricarboxylic anhydride and diphenylhexafluoropropanetricarboxylic anhydride.

As the above-mentioned diamine compound, there can be given, specifically, aliphatic diamine compounds such as hexamethylene diamine, tetramethylene diamine and 4,4'-diaminocyclohexane; and aromatic diamine compounds such as p-phenylenediamine, m-phenylenediamine, 4,4'-diaminodiphenylmethane, 4,4'-diaminodiphenyl ether and 2,4-dimethyl-m-phenylenediamine.

As the above-mentioned diisocyanate, there can be given, specifically, aliphatic diisocyanates such as hexamethylene diisocyanate (HMDI), isophorone diisocyanate (IPDI), 4,4'-methylenebis(cyclohexyl isocyanate) (hydrogenated MDI) and norbornene diisocyanate (NBDI); and aromatic diisocyanates such as trilene diisocyanate (TDI), 4,4'-diphenylmethane diisocyanate (MDI) and xylylene diisocyanate (XDI). And, alcohol-blocked types thereof can be used.

Among others, the base resin of the water-borne resin composition of the present invention is preferably a polyamide-imide resin in point of the heat resistance and the ease of synthesis.

The above-mentioned water-borne resin composition has a hydrolysable functional group and a polymerizable unsaturated carbon bond. The above-mentioned base resin constituting the water-borne resin composition may contain both a hydrolysable functional group and a polymerizable unsaturated carbon bond in a molecule, but it does not necessarily do so. Thus, for example, the base resin may have only either the hydrolysable functional group or the polymerizable unsaturated carbon bond in a molecule. In the latter case, the whole resin composition has both of these two species. That is, the above water-borne resin composition may comprise a resin having the hydrolysable functional group and the polymerizable unsaturated carbon bond, a mixture of a resin having only the hydrolysable functional group and a resin having only the polymerizable unsaturated carbon bond, or a mixture of all of these resins. It is herein defined in the above sense that the above water-borne resin composition has the hydrolysable functional group and the polymerizable unsaturated carbon bond.

The above-mentioned hydrolysable functional group is not particularly limited and for example, onium groups such as an ammonium group, a sulfonium group and a phosphonium group can be given. Among others, an ammonium group and a sulfonium group are preferred because of high adhesion to metal substrates, and among others, a sulfonium group is more preferred.

Further, the water-borne resin composition of the present invention has a polymerizable unsaturated carbon bond. That is, a film is formed by a curing reaction through the polymerization of the polymerizable unsaturated carbon bond. Since curing of the coat proceeds by such a curing reaction, an amount of production of volatile components can be reduced in curing and therefore it is possible to prevent an electric insulating property from deteriorating due to voids in a coat resulting from volatile components in a coat.

The above-mentioned polymerizable unsaturated carbon bond is not particularly limited as long as it forms a curing system in which polymerization of the unsaturated bond allows a reaction to proceed. As such a carbon bond, there may be given polymerizable unsaturated carbon bonds, forming curing systems such as a propargyl-allene curing system, a curing system based on Michael addition reaction of an active methylene group to an $\alpha$, $\beta$-unsaturated bond and a curing system based on oxidative polymerization. Among others, this bond is preferably a polymerizable unsaturated carbon bond forming the propargyl-allene curing system because the combined use of this bond and the above onium group accelerates a curing reaction. That is, the water-borne resin composition of the present invention preferably contains a propargyl group.

Preferably, the water-borne resin composition of the present invention contains a sulfonium group and a propargyl group. When the water-borne resin composition containing the above-mentioned sulfonium group and propargyl group is used as a cationic electrocoating composition, as an electric voltage or current above a certain level is provided in the electrodeposition step, the sulfonium group is subjected to an electrolytic reduction reaction on the electrode, and thereby the ionic group thereof disappears and the sulfonium group can be irreversibly passivated and precipitated. It is considered that, in this electrodeposition step, the electrode reaction provoked generates the hydroxide ion, which is held by the sulfonium ion, with the result that an electrolytically generated base is formed in the coat. This electrolytically generated base can convert the propargyl group existing in the coat and being low in reactivity upon heating to the allene bond high in reactivity upon heating. That is, polymerization derived from the allene bond proceeds in heat curing after the electrodeposition step and a curing reaction is accelerated. Thus, it is possible to attain a film having high adhesion to a substrate by containing these two functional groups.

When the above-mentioned water-borne resin composition has the sulfonium group and the propargyl group, it is preferred that the content of the sulfonium group in the above water-borne resin composition lies within a range of 5 mmol (lower limit) to 100 mmol (upper limit) per 100 g of the resin solids. When this content is less than 5 mmol per 100 g of the resin solids, curability cannot be adequately exerted, and hydrolysability and bath stability deteriorate. When it is more than 100 mmol per 100 g of the resin solids, the coat deposition on the surface of a substrate becomes poor. In addition, as for the content of the above-mentioned sulfonium group, a more preferable content can be selected in accordance with the resin skeleton employed.

When the above-mentioned water-borne resin composition has the sulfonium group and the propargyl group, it is preferred that the content of the propargyl group, which the above water-borne resin composition has, is in a range of 10 mmol (lower limit) to 150 mmol (upper limit) per 100 g of the resin solids. When the above content is less than 10 mmol per 100 g of the resin solids, curability cannot be adequately exerted, and when it is more than 150 mmol per 100 g of the resin solids, the flexibility of the obtained film may deteriorate. In addition, as for the content of the above-mentioned propargyl group, a more preferable content can be selected in accordance with the resin skeleton employed.

When the above-mentioned water-borne resin composition has the sulfonium group and the propargyl group, it is preferred that the total content of the sulfonium group and the propargyl group, which the above water-borne resin composition has, is preferably 200 mmol or less per 100 g of the resin solids. When this content is more than 200 mmol per 100 g of the resin solids, a resin may not be obtained in fact or an intended performance may not be attained. In addition, as for the above total content of the sulfonium group and the propargyl group, a more preferable content can be selected in accordance with the resin skeleton employed.

Part of the propargyl group in the above water-borne resin composition may be converted to an acetylide. An acetylide is a salt-like acetylated metal compound. As for the content of the propargyl group to be converted to an acetylide in the above water-borne resin composition, preferably, the lower limit is 0.1 mmol and the upper limit is 40 mmol per 100 g of the resin solids. When this content is less than 0.1 mmol per 100 g of the resin solids, the effect of the conversion to an acetylide is not sufficiently exerted, and when it is more than 40 mmol per 100 g of the resin solids, the conversion to an acetylide is difficult. As for this content, a more preferable range can be selected in accordance with the metal species employed.

A metal contained in the above-mentioned propargyl group converted to an acetylide is not particularly limited as long as it presents a catalytic action and includes, for example, transition metals such as copper, silver, barium, and the like. If the conformity with an environment is considered, copper and silver are preferred among these and copper is more preferable from the viewpoint of the ready availability. When copper is used as the above-mentioned metal, the content of the propargyl group to be converted to an acetylide in the above water-borne resin composition is more preferably 0.1 to 20 mmol per 100 g of the resin solids.

By converting part of the propargyl group in the above water-borne resin composition to an acetylide, a curing catalyst can be introduced into the resin composition. When the resin composition is prepared in this manner, it is generally unnecessary to use an organic transition metal complex which is difficult to dissolve or disperse in organic solvents and water and is possible to introduce even a transition metal easily through conversion to an acetylide, and therefore even a hard-to-dissolve transition metal compound is applicable to a coating composition without restraint. Further, the occurrence of an organic acid salt as an anion in the electrodeposition bath, which is encountered when a transition metal organic acid salt is used, can be avoided and furthermore, the metal ion will not be removed through ultra filtration, hence the bath management and the design of coating compositions become easy.

A weight-average molecular weight of the water-borne resin composition of the present invention is preferably within a range of 1000 (lower limit) to 5000 (upper limit). When the weight-average molecular weight is less than 1000, the heat resistance and the flexibility deteriorate, and when it is more than 5000, a good coat cannot be formed on the surface of a metal substrate. As for the above weight-average molecular weight, a more preferable molecular weight can be selected in accordance with the resin skeleton.

The above water-borne resin composition may contain a carbon-carbon double bond where desired. Since the above-mentioned carbon-carbon double bond has high reactivity, curability can be further enhanced.

A method of introducing the above sulfonium group and propargyl group is not particularly limited. As such a method, there can be given, for example, a method (I) comprising the step (i) of reacting an epoxy compound with a compound having a functional group reacting with an epoxy group and a propargyl group to obtain an epoxy compound containing a propargyl group and the step (ii) of reacting a polyamide resin, a polyimide resin or a polya- mide-imide resin, and the epoxy compound containing a propargyl group obtained in the step (i), and a sulfide/acid mixture to introduce the propargyl group and the sulfonium group.

As the above-mentioned compound having a functional group reacting with the epoxy group and a propargyl group (hereinafter, referred to as "compound (A)"), there may be used, for example, a compound having both a functional group reacting with the epoxy group, such as a hydroxyl or carboxyl group, and a propargyl group, and specifically, there may be given propargyl alcohol and propargylic acid. Among these, propargyl alcohol is preferred from the viewpoint of its ready availability and ease of reaction.

In providing the above resin composition with a carbon-carbon double bond as required, a compound containing a functional group reacting with the epoxy group and a carbon-carbon double bond (hereinafter, referred to as "compound (B)") may be used in combination with the above-mentioned compound (A) in the above-mentioned step (i). As the above-mentioned compound (B), there may be used a compound containing both a functional group reacting with the epoxy group, such as a hydroxyl or carboxyl group, and a carbon-carbon double bond.

In the above step (i), the epoxy compound is reacted with the above compound (A) to obtain an epoxy compound containing the propargyl group, or the epoxy compound is reacted with the above compound (A) and, as required, the above compound (B) to obtain an epoxy compound containing the propargyl group and the carbon-carbon double bond. In this latter case, in the step (i), the compound (A) and the compound (B) may be mixed together in advance and then subjected to a reaction, or the compound (A) and the compound (B) may be separately subjected to a reaction. In addition, the above functional group reacting with the epoxy group, which the compound (A) has, and the functional group reacting with the epoxy group, which the compound (B) has, may be the same or different.

As for the conditions of a reaction in the above step (i), the reaction is generally carried out at room temperature or at a temperature of 80 to 140° C. for several hours. And, publicly known ingredients, which are required for the progress of the reaction, such as a catalyst and/or a solvent may be used as required. The completion of the reaction can be checked by measuring an epoxy equivalent, and the functional group introduced can be identified by analysis of non-volatile content or by instrumental analysis of the resin composition obtained. The reaction product thus obtained is generally a mixture of epoxy compounds having one or more propargyl groups, or a mixture of epoxy compounds having one or more propargyl groups and carbon-carbon double bonds. In this sense, through the above step (i), there is obtained the epoxy compound containing a propargyl group.

In the step (ii), by reacting a polyamide-imide resin, a polyamide resin or a polyimide resin, and the epoxy compound containing a propargyl group obtained in the step (i), and the sulfide/acid mixture, the sulfonium group is introduced in the epoxy group, and further the resulting epoxy compound having the propargyl group and the sulfonium group is reacted with a polyamide-imide resin, a polyamide resin or a polyimide resin. The introduction of the sulfonium group can be performed by a method of reacting the epoxy group with the sulfide/acid mixture to conduct the introduction of the sulfide and the conversion of the sulfide to the sulfonium group, or a method in which a sulfide is introduced and then the introduced sulfide is converted to a sulfonium group by a reaction with an acid or an alkyl halide such as methyl fluoride, methyl chloride or methyl bromide, or the like, if necessary, followed by anion exchange. From the viewpoint of the ready availability of reaction materials, the method using a sulfide/acid mixture is preferred.

The above-mentioned sulfide is not particularly limited, and for example, aliphatic sulfides, aliphatic-aromatic mixed sulfides, aralkyl sulfides, and cyclic sulfides can be given. Specifically, there can be given, for example, diethyl sulfide, dipropyl sulfide, dibutyl sulfide, dihexyl sulfide, diphenyl sulfide, ethyl phenyl sulfide, tetramethylene sulfide, pentamethylene sulfide, thiodiethanol, thiodipropanol, thiodibutanol, 1-(2-hydroxyethylthio)-2-propanol, 1-(2-hydroxyethylthio)-2-butanol, and 1-(2-hydroxyethylthio)-3-butoxy-1-propanol.

The above-mentioned acid is not particularly limited, and for example, formic acid, acetic acid, lactic acid, propionic acid, boric acid, butyric acid, dimethylolpropionic acid, hydrochloric acid, sulfuric acid, phosphoric acid, N-acetylglycine, and N-acetyl-β-alanine can be given.

Preferably, the mixing ratio between the above sulfide and the above acid in the above sulfide/acid mixture is generally about 100/40 to 100/100 as expressed in terms of sulfide/acid mole ratio.

The reaction in the above step (ii) can be carried out, for example, by mixing a mixture of the epoxy compound containing a propargyl group, obtained in the above step (i), and the predetermined amount of the above sulfide/acid mixture, which have been set, for instance, so as to give the above-mentioned sulfonium group content, with water being 5 to 10 times in mole more than the sulfide used and stirring the mixture generally at 50 to 90° C. for several hours. A residual acid value of 5 or smaller may serve as a criterion in judging the reaction to be completed. The introduction of the sulfonium group in the water-borne resin composition obtained can be identified by potentiometric titration.

The same procedure can be used also in the case where the sulfide is introduced and then the introduced sulfide is converted to the sulfonium group. By introducing the sulfonium group after introduction of the propargyl group, as described above, the sulfonium group can be prevented from being decomposed due to heating.

As a method of introducing the above sulfonium group and propargyl group, in addition to the above method (I), there can be given a method (II) in which a compound formed by adding an epoxy group and/or a propargyl group to a monomer as a raw material is used and polymerized in producing a polyamide resin, a polyimide resin or a polyamide-imide resin, which is a base resin, and then the obtained resin is reacted with a sulfide/acid mixture to introduce the sulfonium group. And, in the case where the base resin is a polyamide resin, there can be given a method (III) in which after a polyamide resin is produced, the polyamide resin is reacted with a compound having a functional group reacting with a functional group of a terminal of the polyamide and a propargyl group, and then reacted with a sulfide/acid mixture to introduce the propargyl group and the sulfonium group.

The above-mentioned monomer, to which an epoxy group and/or a propargyl group is added, is not particularly limited and for example, a compound formed by adding propargyl alcohol to pyromellitic anhydride or trimellitic anhydride can be used.

And, the above-mentioned compound, having a functional group reacting with a functional group of a terminal of the polyamide and a propargyl group, is not particularly limited and for example, a compound, formed by adding propargylic acid to a polyfunctional epoxy compound such as trimethylolpropane triglycidyl ether or the like, can be used.

When part of the propargyl group in the above resin composition is converted to an acetylide, in the case of utilizing the method (I), the conversion to the acetylide can be carried out by the step of reacting the epoxy compound containing a propargyl group, obtained in the above step (i) with a metal compound to thereby convert part of the propargyl group in the above epoxy compound to the corresponding acetylide. The above-mentioned metal compound is preferably a transition metal compound capable of giving an acetylide and for example, complexes or salts of transition metals described above can be given. Specifically, there can be given, for example, acetylacetone copper, copper acetate, acetylacetone silver, silver acetate, silver nitrate, acetyl acetone barium, and barium acetate. Among these, copper or silver compounds are preferred from the viewpoint of the conformity with an environment, and copper compounds are more preferred because of their ready availability. For example, acetylacetone copper is suitably used in view of the ease of bath control.

Further, in the case of utilizing the method (I), the step of converting part of the propargyl group in the epoxy compound to an acetylide and the above step (ii) can be carried out under common reaction conditions, so that both steps can be carried out simultaneously. The method of carrying out both steps simultaneously can advantageously simplify the production process.

In this way, the resin composition containing a propargyl group and a sulfonium group, and optionally containing a carbon-carbon double bond and/or a propargyl group-derived acetylide as required can be produced while preventing the sulfonium group from being decomposed. Incidentally, acetylides in a dry state are explosive but the reaction in the practice of the invention is carried out in a water-borne medium and the intended substance can be obtained in the form of a water-borne composition. Therefore, there arises no safety problem.

The water-borne resin composition of the present invention is formed by dispersing the resin composition obtained in a manner described above in a water-borne medium. The above-mentioned water-borne medium is not particularly limited and for example, water and a mixed solvent of water and another solvent can be given. The above-mentioned another solvent is not particularly limited as long as it exhibits compatibility with water and for example, hydrocarbons (for example, xylene or toluene), alcohols (for example, methyl alcohol, n-butyl alcohol, isopropyl alcohol, 2-ethylhexyl alcohol, ethylene glycol, propylene glycol), ethers (for example, ethylene glycol monoethyl ether, ethylene glycol monobutyl ether, ethylene glycol monohexyl ether, propylene glycol monoethyl ether, 3-methyl-3-methoxybutanol, diethylene glycol monoethyl ether, diethylene glycol monobutyl ether), ketones (for example, methyl isobutyl ketone, cyclohexanone, isophorone, acetyl acetone), esters (for example, ethylene glycol monoethyl ether acetate, ethylene glycol monobutyl ether acetate), and mixtures thereof can be given.

The present invention is also an electrocoating composition comprising the above-mentioned water-borne resin composition. Since the above-mentioned electrocoating composition contains the water-borne resin composition described above and is applied by electrodeposition, it can provide a film, which is uniform and excellent in heat resistance, processability and flexibility, for an article to be coated having a complex configuration.

The above-mentioned electrocoating composition does not necessarily need to use a curing agent since the resin composition itself contained in the electrocoating composition has the curability. But, the curing agent may be used to further enhance the curability. As such a curing agent, there can be given, for example, a compound obtained by adding a compound having a propargyl group such as propargyl alcohol and the like and a compound having a carbon-carbon double bond such as acrylic acid and the like to a compound containing a plurality of at least one species of a propargyl group and a carbon-carbon double bond, e.g. polyepoxide such as novolac phenol and pentaerythrite tetraglycidyl ether.

It is not always necessary to use a curing catalyst in the above electrocoating composition. However, when a further improvement in curability is required depending on the curing reaction conditions, a transition metal compound generally to be used may be appropriately added as required. Such a compound is not particularly limited but includes, among others, complexes or compounds formed by combining a ligand, such as cyclopentadiene or acetylacetone, or a carboxylic acid such as acetic acid, with transition metals such as nickel, cobalt, manganese, palladium, and rhodium. The amount of the above curing catalyst to be added is preferably in a range of 0.1 mmol (lower limit) to 20 mmol (upper limit) per 100 g of the resin solids in the electrocoating composition.

An amine may further be blended in the electrocoating composition of the present invention. By the addition of the above amine, the conversion rate of the sulfonium group to a sulfide by electrolytic reduction in the process of electrodeposition is increased. The above-mentioned amine is not particularly limited and for example, amine compounds such as primary to tertiary monofunctional or polyfunctional aliphatic amines, alicyclic amines and aromatic amines can be given. Among these, water-soluble or water-dispersible ones are preferred. As such the amines, there may be given, for example, alkylamines having 2 to 8 carbon atoms such as monomethylamine, dimethylamine, trimethylamine, triethylamine, propylamine, diisopropylamine and tributylamine; monoethanolamine, dimethanolamine, methylethanolamine, dimethylethanolamine, cyclohexylamine, morpholine, N-methylmorpholine, pyridine, pyrazine, piperidine, imidazoline, imidazole and the like. These may be used alone or two or more of them may be used in combination. Among others, hydroxy amines such as monoethanolamine, diethanolamine and dimethylethanolamine are preferred because of the excellent dispersion stability in water.

The above amine can be directly blended in the electrocoating composition of the present invention. While in the conventional neutralized amine type cationic electrocoating, the addition of a free amine results in deprivation of the neutralizing acid in the resin, hence in marked deterioration of the stability of the electrodeposition solution, no such bath stability trouble will arise in the present invention.

The amount of the above amine to be blended is preferably in a range of 0.3 to 100 milliequivalents (meq) per 100 g of the resin solids in the electrocoating composition. When this amount is less than 0.3 meq/100 g, an adequate effect on a throwing power cannot be attained. When it exceeds 100 meq/100 g, the effects proportional to the addition amount cannot be obtained and this is not economical. This amount is more preferably in a range of 1 to 15 meq/100 g.

In the electrocoating composition of the present invention, there may also be blended an aliphatic hydrocarbon group-containing resin composition. By blending the above-mentioned aliphatic hydrocarbon group-containing resin composition, the shock resistance of the film to be obtained is improved. As the aliphatic hydrocarbon group-containing resin composition, there may be mentioned those containing, per 100 g of the resin solids, 5 to 400 mmol of a sulfonium group, 80 to 135 mmol of an aliphatic hydrocarbon group containing 8 to 24 carbon atoms and optionally containing an unsaturated double bond in the chain thereof and 10 to 315 mmol of at least one of a propargyl group and organic groups containing 3 to 7 carbon atoms and having a terminal unsaturated double bond on condition that the total content of the sulfonium group, the aliphatic hydrocarbon group containing 8 to 24 carbon atoms and optionally containing an unsaturated double bond in the chain thereof and the propargyl group and organic groups containing 3 to 7 carbon atoms and having a terminal unsaturated double bond is not more than 500 mmol per 100 g of the resin solids.

When such an aliphatic hydrocarbon group-containing resin composition is blended in the above electrocoating composition, the resin solids in the electrocoating composition preferably contains, per 100 g thereof, 5 to 400 mmol of sulfonium group, 10 to 300 mmol of the aliphatic hydrocarbon group containing 8 to 24 carbon atoms and optionally containing an unsaturated double bond in the chain thereof and a total of 10 to 485 mmol of the propargyl group and organic groups containing 3 to 7 carbon atoms and having a terminal unsaturated double bond, and the total content of the sulfonium group, the aliphatic hydrocarbon group containing 8 to 24 carbon atoms and optionally containing an unsaturated double bond in the chain thereof, the propargyl group and the organic groups containing 3 to 7 carbon atoms and having a terminal unsaturated double bond is not more than 500 mmol per 100 g of the resin solids in the electrocoating composition, and the content of the aliphatic hydrocarbon group containing 8 to 24 carbon atoms and optionally containing an unsaturated double bond in the chain thereof is 3 to 30% by weight relative to the resin solids in the electrocoating composition.

When the aliphatic hydrocarbon group-containing resin composition is blended in the above electrocoating composition and the sulfonium group content level is lower than 5 mmol/100 g, any satisfactory throwing power or curability cannot be attained and, further, the hydrolysability and bath stability will be poor. When it exceeds 400 mmol/100 g, the deposition of coatings on the surface of the articles to be coated worsens. When the content of the aliphatic hydrocarbon group containing 8 to 24 carbon atoms and optionally containing an unsaturated double bond in the chain thereof is less than 80 mmol/100 g, the shock resistance will not be improved to a satisfactory extent and, when it exceeds 350 mmol/100 g, the resin composition becomes difficult to handle. When the total content of the propargyl group and the organic groups containing 3 to 7 carbon atoms and having a terminal unsaturated double bond is less than 10 mmol/100 g, no satisfactory curability can be manifested on the occasion of combined use of another resin and/or another curing agent and, when it exceeds 315 mmol/100 g, the shock resistance will not be improved to a satisfactory extent. The total content of the sulfonium group, the aliphatic hydrocarbon group containing 8 to 24 carbon atoms and optionally having an unsaturated double bond in the chain thereof, the propargyl group and the organic groups containing 3 to 7 carbon atoms and having a terminal unsaturated double bond is not more than 500 mmol per 100 g of the resin solids. When it exceeds 500 mmol, any corresponding resin cannot be obtained in actuality or the desired performance characteristics cannot be obtained in some instances.

The above electrocoating composition may further contain other components used in an ordinary electrocoating as required. The above-mentioned another component is not particularly limited, and for example, a pigment, a rust preventive, a pigment dispersion resin, a surfactant, an antioxidant and an ultraviolet absorber can be given.

The above-mentioned pigment is not particularly limited, and for example, coloring pigments such as titanium dioxide, carbon black, red iron oxide, and the like; rust-preventive pigments such as basic lead silicate, aluminum phosphomolybdate, and the like: and extender pigments such as kaoline, clay, talc, and the like, can be given. As the above-mentioned rust preventive, specifically, there may be given calcium phosphite, zinc calcium phosphite, calcium-carrying silica, calcium-carrying zeolite, and the like. The total amount of the above pigments and rust preventives to be blended is preferably in a range of 0 weight % (lower limit) to 50 weight % (upper limit) in terms of the solid content in the above electrocoating composition.

The above pigment dispersion resins are used to stably disperse the above pigments in the electrocoating composition. The pigment dispersion resins are not particularly restricted and pigment dispersion resins which are in general use can be employed.

When electrodeposition is performed using the electrocoating composition of the present invention, the article to be coated is not particularly limited as long as it is one exhibitting conductivity, and for example, an iron sheet, a steel sheet, an aluminum sheet, and articles formed by surface treating or molding these can be given.

As electrodeposition, there may be given, for example, cationic electrodeposition conducted by utilizing an article to be coated as a cathode and applying a voltage generally within the range of 50 to 450 V between the cathode and an anode. When the voltage applied is lower than 50 V, electrodeposition becomes insufficient. When the voltage exceeds 450 V, the power consumption uneconomically increases. When the electrocoating composition of the present invention is used and a voltage within the above range is applied, a uniform coat can be formed on the whole article to be coated without any rapid increase in film thickness in the process of electrodeposition. In ordinary cases, a bath temperature of the electrocoating composition in applying the above voltage is preferably 10 to 60° C.

An electrodeposition process preferably comprises (1) a process of immersing an article to be coated in an electrocoating composition and (2) a process of utilizing the above article to be coated as a cathode and applying a voltage between the cathode and an anode to deposit a coat. Though a duration during which a voltage is applied varies depending on the conditions of electrodeposition, it may be generally set at a duration of 2 to 4 minutes.

An electrodeposited coat obtained in a manner described above can be cure by being baked at a temperature of 150 to 260° C. for 10 to 30 minutes as is or following washing with water after the completion of the electrodeposition process to obtain a cured film.

A film thickness of the above cured electrodeposited film is preferably within a range of 5 μm (lower limit) to 200 μm (upper limit). When the film thickness is out of the above range, a film to be obtained may become uneven.

The article to be coated, on which a film thus obtained is formed, may be further coated with an intermediate coating composition and/or a top coating composition in accordance with a purpose.

The water-borne resin composition of the present invention contains at least one species selected from the group consisting of a polyamide-imide resin, a polyamide resin and a polyimide resin, which are excellent in the heat resistance and the flexibility, as a base resin and can be suitably applied by electrodeposition which is excellent in the workability of coating. And, the above water-borne resin composition can attain a film having high adhesion because it has a hydrolysable functional group and a polymerizable unsaturated carbon bond. Further, since the base resin of the above resin composition is at least one species selected from the group consisting of a polyamide-imide resin, a polyamide resin and a polyimide resin, the film to be obtained from the above resin composition also has a high insulating property.

It is possible to produce the film being excellent in the heat resistance and the flexibility by using the water-borne resin composition of the present invention. Thereby, the processability of the film is also improved and the film becomes applicable to the electric and electronic fields. Also, since the water-borne resin composition of the present invention is used suitably for the electrodeposition, it is possible to apply a coating efficiently even to an article to be coated having a complex configuration.

BEST MODES FOR CARRYING OUT THE INVENTION

Hereinafter, the present invention will be described in more detail by way of examples, but the present invention is not limited to these examples. In addition, "part(s)" refers to "part(s) by weight" in Examples, unless otherwise specified.

EXAMPLE 1

In a separable flask equipped with a stirrer, a thermometer, a nitrogen gas inlet tube and a reflux cooling tube, 431 parts by weight of EPOTOHTO YH-300 with an epoxy equivalent of 144 (an epoxy compound produced by Tohto Kasei Co., Ltd.) and 180 parts by weight of propargyl alcohol were put, and the mixture was heated to 125° C. and reacted at that temperature for 5 hours to obtain an epoxy compound containing a propargyl group.

321 parts by weight of N-methyl-2-pyrrolidone, 192 parts by weight of trimellitic anhydride, and 200 parts by weight of diphenylmethane-4,4'-diisocyanate were put in a separable flask equipped with a stirrer, a thermometer, a nitrogen gas inlet tube and a reflux cooling tube, and the mixture was heated to 150° C. and reacted at that temperature for 10 hours to obtain a resin composition.

This product was cooled to 80° C. and to this was added 243 parts by weight of the epoxy compound containing a propargyl group previously prepared, and this mixture was reacted for 5 hours. To this were added 54 parts by weight of 1-(2-hydroxyethylthio)propane-2-ol, 19 parts by weight of glacial acetic acid and 57 parts by weight of deionized water, and the mixture was reacted for 6 hours while maintaining the temperature at 75° C. After verifying that an acid value is 5 or less, 2273 parts by weight of deionized water was added to give an intended water-borne resin composition. This resin composition had a resin solids content of 20 weight % and the sulfonium group was 28 mmol/100 g varnish.

COMPARATIVE EXAMPLE 1

In a separable flask equipped with a stirrer, a thermometer, a nitrogen gas inlet tube and a reflux cooling tube, 234 parts by weight of EPOTOHTO YDCN-703 with an epoxy equivalent of 203 (an epoxy compound produced by Tohto Kasei Co., Ltd.) and 101 parts by weight of propargyl alcohol were put, and the mixture was heated to 125° C. and reacted at that temperature for 5 hours to obtain an epoxy compound containing a propargyl group.

This product was cooled to 80° C. and to this were added 27 parts by weight of 1-(2-hydroxyethylthio)propane-2-ol, 29 parts by weight of glacial acetic acid and 10 parts by weight of deionized water, and the mixture was reacted for 6 hours while maintaining the temperature at 75° C. After verifying that an acid value is 5 or less, 1222 parts by weight of deionized water was added to give an intended water-borne resin composition. This resin composition had a resin solids content of 20 weight % and the sulfonium group was 28 mmol/100 g varnish.

Evaluation Test

The water-borne resin compositions prepared in Example 1 and Comparative Example 1 were put in a 4 liter, stainless steel container and thus, an electrodeposition bath was constituted. A copper plate having a thickness of 0.3 mm and a size of 35 mm×75 mm was placed in an electrodeposition bath liquid and electrodeposition coated so as to be 100 μm in a dried film thickness. After the resulting copper plates were washed with water, they were cured by heating at 250° C. for 20 minutes to obtain electrodeposition films. The following evaluations were performed on the obtained electrodeposition films and the results were shown in Table 1.

(1) Flexibility Test

The presence or absence of cracks of each film was investigated by using a steel rod of 5 mm in diameter as a bending central line and bending the coated copper plate around the steel rod by an angle of 180° at 25° C. for 0.5 seconds.

(2) Heat Resistance Test

Each film on the copper plate was heated at 250° C. for 24 hours and a ratio of remaining weight was determined from weights measured before and after heating.

(3) Insulating Property Test

The measuring terminals of a withstand voltage tester Model 8525 (manufactured by Tsuruga Electric Corporation) were connected to a conductive portion of the copper plate and a portion of the obtained electrodeposition film and a dielectric breakdown voltage was measured under the condition of 500 V/s.

TABLE 1

| | Example 1 | Comparative Example 1 |
|---|---|---|
| Flexibility | No cracks | Cracks were found. |
| Heat resistance (weight %) | 96 | 90 |
| Insulating property (kV) | 9.7 | 9.6 |

It was shown from Table 1 that the film, which was obtained by using the water-borne resin composition of the present invention, was excellent in the flexibility, the heat resistance and the insulating property.

The invention claimed is:

1. A water-borne resin composition, having a hydrolysable functional group and a polymerizable unsaturated carbon bond,
    wherein said water-borne resin composition contains at least one species selected from the group consisting of a polyamide-imide resin, a polyamide resin and a polyimide resin as a base resin, and wherein the hydrolysable functional group is an onium group.

2. The water-borne resin composition according to claim 1, wherein the onium group is a sulfonium group.

3. The water-borne resin composition according to claim 1 or 2,
    wherein the polymerizable unsaturated carbon bond derives from a propargyl group.

4. An electrocoating composition, comprising the water-borne resin composition according to claim 1 or 2.

5. The water-borne resin composition according to claim 3,
    wherein said water-borne resin composition contains a sulfonium group in an amount of 5 to 100 mmol and a propargyl group in an amount of 10 to 150 mmol per 100 g of the resin solids and the total content of said sulfonium group and said propargyl group is 200 mmol or less per 100 g of the resin solids.

* * * * *